UNITED STATES PATENT OFFICE.

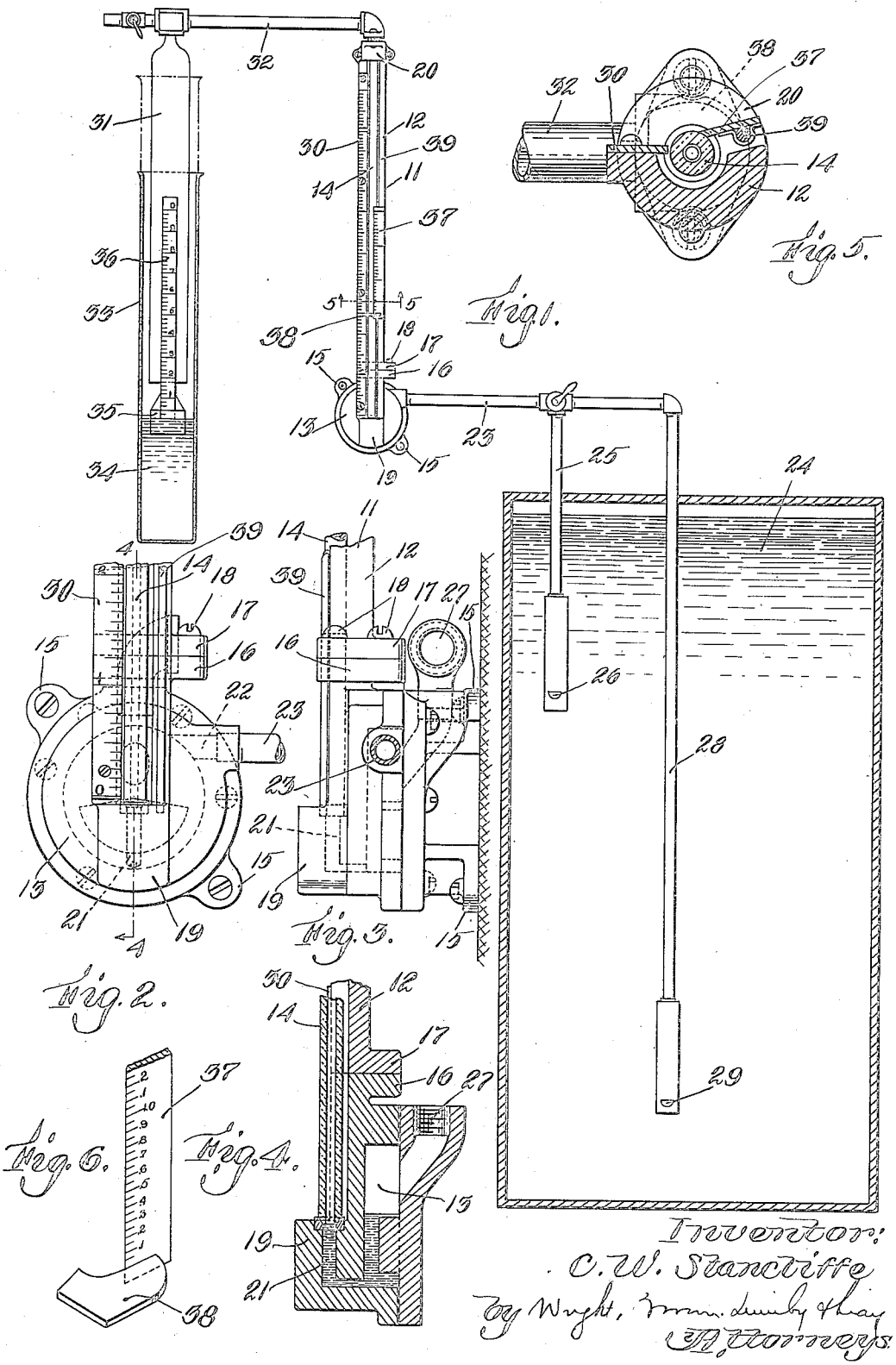

CECIL W. STANCLIFFE, OF TORONTO, CANADA, ASSIGNOR TO PNEUMERCATOR COMPANY, OF NEW YORK, N. Y., A CORPORATION OF MAINE.

MANOMETER.

1,421,739. Specification of Letters Patent. Patented July 4, 1922.

Application filed September 26, 1919. Serial No. 326,571.

*To all whom it may concern:*

Be it known that I, CECIL W. STANCLIFFE, a subject of the King of Great Britain, residing at Toronto, Canada, have invented new and useful Improvements in Manometers, of which the following is a specification.

This invention relates to apparatus for indicating and measuring fluid pressures and the values which are derived from or are functions of fluid pressures.

The object of the invention is to increase the ease and accuracy of reading manometers organized to measure such pressures and values, and particularly to achieve such results in connection with manometers of the column type. I would state, however, that I do not limit the invention to use with or application to column manometers only, but that I reserve the right to its use with pressure measuring instruments of all sorts, including gages of the spring tube, diaphragm, and bellows types, as well as those of the column type.

In this specification, the term manometer is intended to include any measuring device having an indicating element which is movable in response to fluid pressure, whether such element is a column of liquid in a tube, or is a pointer movable mechanically directly or indirectly by pressure application.

Among the uses to which the invention is applicable may be named those of measuring the depth of liquid in tanks, or of any submerged point below the surface of a body of liquid, the height of columns of liquid, the specific gravity of liquids and the weight of a body of liquid of any specific gravity, and fluid pressures derived from any source. In all these uses the special utility of the invention is substantially the same, and it may be stated generally as being to provide means for enabling finer readings to be taken than can be read directly from the scale of the principal manometer instrument. In other words, the effect of using the invention is the same as though the graduations of the manometer scale representing given units were enlarged and subdivided into fractions of such units. It has particularly great utility in cases where the range of indications of the manometer is required to be so large that the unit graduations of the scale must be particularly small. In any case, however, the present invention has the effect of a micrometer to show on a large scale small differences in position of the manometer indicator; and of a vernier, in that it is an adjunct to a measuring instrument and shows fractional parts of the graduations of the scale of such instrument.

In the drawings furnished herewith, I have illustrated, and in the following specification have described in detail, the application of my invention to a column manometer for the purpose of measuring the depth of liquid in a tank and the specific gravity of whatever liquid may be placed in the tank, simply for the purpose of clear illustration and explanation of the principles of the invention, and without intent thereby to limit the scope in which I claim protection therefor.

Referring to the drawings, in which the invention is represented as applied for the purpose indicated:

Figure 1 is an elevation, somewhat diagrammatic in character, of a column manometer assembled in a depth measuring apparatus, and combined with the auxiliary reading means embodying the present invention.

Figure 2 is an elevation, enlarged, of a part of the manometer instrument here shown, illustrating some of the details of construction of a preferred form thereof.

Figure 3 is a side view of the same, as seen from the right of Figure 2.

Figure 4 is a longitudinal central section on line 4—4 of Figure 2.

Figure 5 is a cross section, enlarged, on line 5—5 of Figure 1.

Figure 6 is a perspective view of a detail of one of the scales.

The same reference characters indicate the same parts in all of the figures.

In the drawings, 11 represents the manometer as a whole. In the special construction of instrument here shown, it consists of a semi-tubular frame or holder 12, a chamber or pot 13 containing mercury (or other fluid adapted to serve as an indicating medium), and a tube 14. This chamber or pot 13 I will call for convenience hereafter the mercury pot. The mercury pot is provided with feet or lugs 15, whereby it may be secured on an instrument board or on a wall or a bulkhead in a ship, and it also has a flange 16, to which the frame 12 is secured by means of a flange 17 on the latter, and screws 18. The tube 14 is confined between a boss 19 on the front of the pot 13, and a ledge 20 at the top of the frame 12. In the boss there is a passage 21, opening into the interior chamber of the mercury pot at a point near the bottom of such chamber; while a passage 22 opens from the upper part of the chamber, and is connected with a pipe 23, which forms part of a pipe-line entering a tank 24 containing liquid. The tank 24 here shown is to be considered as typical of any container of liquid, whether an artificial tank or the banks and bed of a natural body of water. The pipeline formed in part by the pipe 23, and in part by a descending pipe 25, enters the body of liquid in the tank, and is provided with an external orifice 26.

A third opening 27, leading into the chamber in the mercury pot, is provided for connection with a pump, or a tank containing compressed air or other gas under pressure more than sufficient to balance the pressure head of the liquid above the orifice 26. I have not shown the pump or container for compressed gas here, as any sort of pump or source of compressed gas may be used for the purpose of expelling from the lower end of the pipe-line any liquid which may have entered it, and of exerting on the manometer a pneumatic pressure equal to the pressure head of the liquid above the orifice 26.

A second pipe-line 28 is here shown as being likewise connected with the mercury pot, and is provided with an external orifice 29, at a different level in the tank. This second line is for the special use of readily determining specific gravities, and is not essential to the present invention.

Now when air is admitted to either pipeline, at a pressure and in quantity great enough to expel the liquid which may have entered the pipe-line through the orifice thereof, the pressure of such air is applied upon the surface of the indicating liquid in the mercury pot 13, and a column of the indicating medium is caused to rise in the tube 14 until the pressure head of the column balances the pneumatic pressure acting to raise it.

Frequently the head of the indicating column will occupy a position between graduations of the scale 30 beside the tube 14; or it may happen that, when the indicating medium is mercury, the movements of the rise and descent of the column for slight changes in pressure will not be great enough to enable readings to be taken with the desired accuracy. To enable fractions of the graduations and minute movements of the column to be read with ease and accuracy, I have provided what may be called an auxiliary manometer, or a micrometer vernier device, of which the embodiment here shown comprises a tube or bell 31, having an open lower end, and being connected at its upper end in a leakage-tight manner, but with internal communication to the manometer tube 14, by a connection 32. This bell is preferably of substantially uniform diameter in cross sectional area at all points in its length, and it enters and passes downwardly into an outer tube or container 33, which is likewise preferably of uniform cross sectional area and dimensions in all parts of its length. Although the form above indicated is preferable for various reasons of convenience, it is not essential to the proper functioning of the instrument, and may be departed from without departure from the essentials of the invention.

The outer tube contains a body of liquid 34, which is lighter than mercury, or whatever other fluid may be used in the column 14, and may be water, oil or any other sufficiently permanent fluid. A float 35 is supported by the liquid 34, and carries a scale 36, of which the zero may be at the surface of the liquid. The relative masses of the submerged part of the float and upright scale may be made in such values that the scale is upright when the float is in stable flotation. The body of the float is likewise of a diameter small enough to enable it to enter the bell or inverted inner tube 31.

It will be understood that, if the outer tube is raised,—by hand or otherwise,—until the edge of the bell 31 enters the liquid and is sealed thereby, the air in the bell 31, connection 32 and tube 14 above the head of the indicating column will be trapped, and that further rise of the outer tube will cause the air thus entrapped to be compressed. The pressure so created will have the double effect of lowering the column in the manometer tube 14 and of raising the liquid 34 in the space between the inner and outer tubes, and the rise of liquid in this manner is a measure of the degree of compression of the trapped air. The scale 36 may be properly calibrated and graduated to enable values of this sort to be read in terms of pressure or of depth or of a value derived from depth or pressure. The reading is taken on the line where the surface of the liquid thus raised in the tube 33 crosses the scale 36. Of course, it is understood that the tubes 31 and 33 are transparent, in part at least, to the extent necessary to permit readings, such as have just been described, to be made.

When the liquid 34 is of less specific gravity than the indicating liquid used in the manometer tube 14, the result of the contrivance just described is in effect to enlarge or multiply the distance between graduations of the scale 30, or, expressed in another way, to interpolate in the scale 30 a scale of fractions of said graduations, or to provide a vernier on an enlarged scale for reading fractions of said scale 30. The movements caused in the manner described to the column of liquid raised in the tube 33 around the bell 31 are greater than the movements of the manometer tube 14 for the same pressures, in inverse ratio to the specific gravities of the liquids in the tubes, respectively.

While the arrangement of the scale 36 supported in a floating manner, as described, is preferable, because it enables the height of the column of liquid in the outer tube 33 to be read without looking through the liquid (that is, by sighting across the top of this liquid column to the scale), nevertheless I may obviously provide a scale arranged in a different manner, as upon the outside of the outer tube or container.

One possible mode of using the auxiliary manometer, or micrometer vernier thus described is to raise the outer tube 33 until the head of the column in the manometer has been forced back to the level of one of the graduations on the scale 30, say, for instance, one of the unit graduations, and then to take a reading of the height of the liquid 34 on the scale 36. This mode of use is helpful when the head of the manometer column lies between two graduations of the adjacent scale, since it substitutes an exact reading, in reference to graduations of smaller fractional value, for an estimation. In another mode of use, the outer tube 33 may be fixed in one location, where the bell is sealed and the air therein sufficiently compressed, as previously described, and then readings of the fluid pressures in the pipe-lines taken directly on the scale 36; but it is necessary, in this use, to see to it that the bell remains sealed, as escape of the entrapped air would alter the basis of reading. Thus there is afforded a means for multiplying the indications of slight fluctuations of pressure above the indications given by the manometer. In any use of the device, the floating scale simplifies the readings since it is only necessary to note the top of the column in the tube 33 and the graduation on the scale 36 nearest to the same level.

Another purpose for which the apparatus is shown as adapted is that of measuring the specific gravity of liquids in the tank 24. In so doing, the orifices 26 and 29 are used in succession. If it be assumed that these orifices are at different levels of known vertical distance apart, it will be evident that the difference between readings on the manometer of the liquid heads at the orifices 26 and 29 respectively will be in proportion to the specific gravity of the liquid. The values of such specific gravities may be read with reference to a scale 37, which extends beside the manometer tube and is adjustable lengthwise thereof, or with reference to the fixed scale 30, as fully explained in my prior application, filed June 17, 1919, Serial Number 304871, and they may be likewise read by the micrometer vernier in the following manner; that is, air may be blown from out of the pipe-line 25, and the reading of the manometer 14 noted. Then air may be blown through the other line 28, thereby increasing the pneumatic pressure acting upon the manometer; then the vernier device may be manipulated to bring back the head of the manometer column in 14 to the first position. In so doing, the column of liquid in the tube 33 will rise to a height balancing this pressure difference, which can be read from the scale 36. Such scale may be graduated in terms of specific gravity, or it may embody different scales, one of which is a specific gravity scale with respect to which the values last referred to may be read.

Since the accuracy of the vernier readings depends upon the position of the main manometer column being accurately located, I prefer to provide a sighting means with reference to which it may be determined when the head of the indicating column is exactly opposite any graduation. Various means for this purpose may be used, but I have illustrated by way of explanation an index 38, carried by the sliding scale 37, and projecting across the column 14 into close proximity to the scale 30. The scale 37 is a slide, adapted to move endwise upon a guide rod 39, and to be set in any position, whereby the index may be placed in the plane of any graduation of scale 30. The index may be made with a flat sighting surface, as shown in Figure 6; or otherwise with two or more sighting points in a plane perpendicular to the tube, in order to avoid errors due to parallax. It is possible to push back the indicator element, in the manner described, into exact line with a graduation with reference to this index, more accurately than it is possible to estimate fractions of spaces between graduations when the column occupies an intermediate position. Therefore the micrometer vernier serves a useful purpose in measuring on a large scale small differences in position of the manometer.

This multiplying reading device or vernier, that is, the principle contained in the specific form of the device here shown, is applicable to manometer tubes of any sort, used for any purpose. For thus applying it, all that is necessary is a connection which will transmit pressure pneumatically from the manometer tube to the multiplying device. Such connection should be applied to the manometer above the head of the indicating column therein, whereby the same pneumatic pressure acts equally on the head of this column and on the body of liquid 34 in the tube 33.

One particular field of use for the invention is in connection with instruments in which, on account of the length of the range of indications, a heavy indicating liquid must be used, in order to keep the length of the manometer within reasonable limits; and in that case the multiplying device enables differences in pressures occurring in any part of the range of the manometer to be very accurately read. Of course, any liquids of relatively different specific gravities may be used in the manometer and in the multiplying vernier respectively.

I have previously mentioned that the invention may be applied to other forms of manometer than those of the column type. This is easily possible with gages of the sort in which the actuating pressure occupies a closed chamber (such as a diaphragm or bellows chamber, or a Bourdon spring tube, etc.), by enclosing the whole instrument in a tight casing, and connecting the auxiliary manometer with such casing in such a manner that the back pressure created by the auxiliary manometer is applied externally upon the pressure measuring element of the gage.

While I have in the foregoing description mentioned the "bell" 31 and a "connection" 32 by distinctive terms, it will be obvious on reflection that these two elements are in fact parts of a single conduit or pipeline, which has a branch (the bell 31) with an orifice at a low point adapted to be submerged in the indicating liquid 34, and is connected to the manometer 14 above the head of the column therein. Therefore I have used the term "conduit" in certain of the appended claims to signify the combined connection 32 and bell 31, and all equivalents thereof, and I have also there used the term "branch" in connection with the recital of the "conduit" to signify the bell 31 and its equivalents. The outer tube or container 33 is, in its function and effect, a manometer in which an annular column is caused to rise, measuring the pneumatic pressure on the head of the column in 14, and it is for this reason that I have called it a secondary or auxiliary manometer. Other forms of pressure-indicating means than the specific one here shown may be used as the auxiliary manometer,—for instance, a U-tube type or an ordinary pressure gage of any type,—without departure from the essence of the invention, and within the scope for which I claim protection.

What I claim and desire to secure by Letters Patent is:

1. The combination with a manometer, of a multiplying vernier comprising a container for liquid, and a conduit arranged to descend into the liquid in said container and having an open orifice adapted to be maintained beneath the surface of said liquid, said conduit containing air and being connected to the manometer in such manner that its air contents exert back pressure in the manometer, while exerting pressure on the liquid.

2. The combination with a manometer tube containing an indicating liquid column of a conduit connected with said tube above the indicating liquid and containing air, a container for a different indicating liquid, and an open branch from the conduit extending downward into the container and adapted to pass beneath the surface of the liquid therein, whereby pressure transmitted pneumatically through the conduit by rise of the indicating column in the manometer causes rise of the liquid in said container.

3. The combination with a manometer tube containing an indicating liquid column, of a conduit connected with said tube above the indicating liquid, a container for a different indicating liquid, a branch from the conduit extending into the container and adapted to pass beneath the surface of the liquid therein, whereby pressure transmitted pneumatically through the conduit by rise of the indicating column in the manometer causes rise of the liquid in said container, a float supported in the liquid in the container, and a scale rising from said float into the said conduit branch and having its beginning at the liquid line of the float.

4. The combination with a manometer tube containing an indicating liquid column, of a conduit connected with said tube above the indicating liquid, a container for a different indicating liquid, a branch from the conduit extending into the container and adapted to pass beneath the surface of the liquid therein, whereby pressure transmitted pneumatically through the conduit by rise of the indicating column in the manometer causes rise of the liquid in said container, said container and conduit branch being relatively movable up and down, whereby to cause emergence of the branch from the liquid to equalize the pressure in the conduit with the atmospheric.

5. The combination with a manometer tube containing an indicating liquid column, of a conduit connected with said tube above the indicating liquid, a container for a different indicating liquid, a branch from the conduit extending into the container and adapted to pass beneath the surface of the liquid therein, whereby pressure transmitted pneumatically through the conduit by rise of the indicating column in the manometer causes rise of the liquid in said container, and the liquid raised in the container by excess of pressure in the conduit over the atmospheric pressure measures by its height the amount of such excess pressure.

6. The combination of a pressure indicator having high pressure and low pressure terminals, and an auxiliary pressure indicator connected by means of its high pressure terminal with the low pressure terminal of the first-named indicator and having an indicating means of greater sensitiveness.

7. The combination with a column manometer, of an auxiliary manometer connected through its high pressure terminal with the first-named manometer at a point above the head of the column therein, and including an indicating medium arranged to move through a greater distance than the column of the first manometer for the same pressure difference.

8. A manometer comprising inner and outer tubes with an intermediate space in which the indicating liquid may rise, the inner tube being open at its bottom and sealed in the liquid, a float in the inner tube supported by the liquid, and a scale rising from said float, arranged to indicate with reference to the surface of the liquid in said intermediate space the difference between the liquid levels inside and outside of the inner tube.

9. A manometer comprising inner and outer tubes with an intermediate space in which the indicating liquid may rise, the inner tube being open at its bottom and sealed in the liquid, a float in the inner tube supported by the liquid, and a scale rising from said float with its beginning point at the liquid line thereof.

10. The combination with a pressure measuring manometer having an indicating element movable in response to fluid pressures, of an auxiliary manometer of greater sensitiveness having an indicating element movable by pneumatic pressure and being connected with the first-named manometer, whereby the actuating fluid pressure of the second manometer is a back pressure opposing movement of the indicating element of the first manometer.

11. The combination of main and auxiliary manometers, each having an indicating element movable in response to fluid pressures, the auxiliary manometer being of greater sensitiveness than the main manometer, and both manometers being operatively connected in a manner causing the pressure that operates the auxiliary manometer to act on the main manometer in opposition to the pressure actuating the latter.

12. The combination of main and auxiliary manometers in tandem arrangement, each manometer having an indicating medium movable in response to fluid pressures, and means for applying fluid pressure to the auxiliary manometer and at the same time exerting back pressure against the indicating medium of the main manometer.

In testimony whereof I have affixed my signature.

CECIL W. STANCLIFFE.